Patented July 27, 1926.

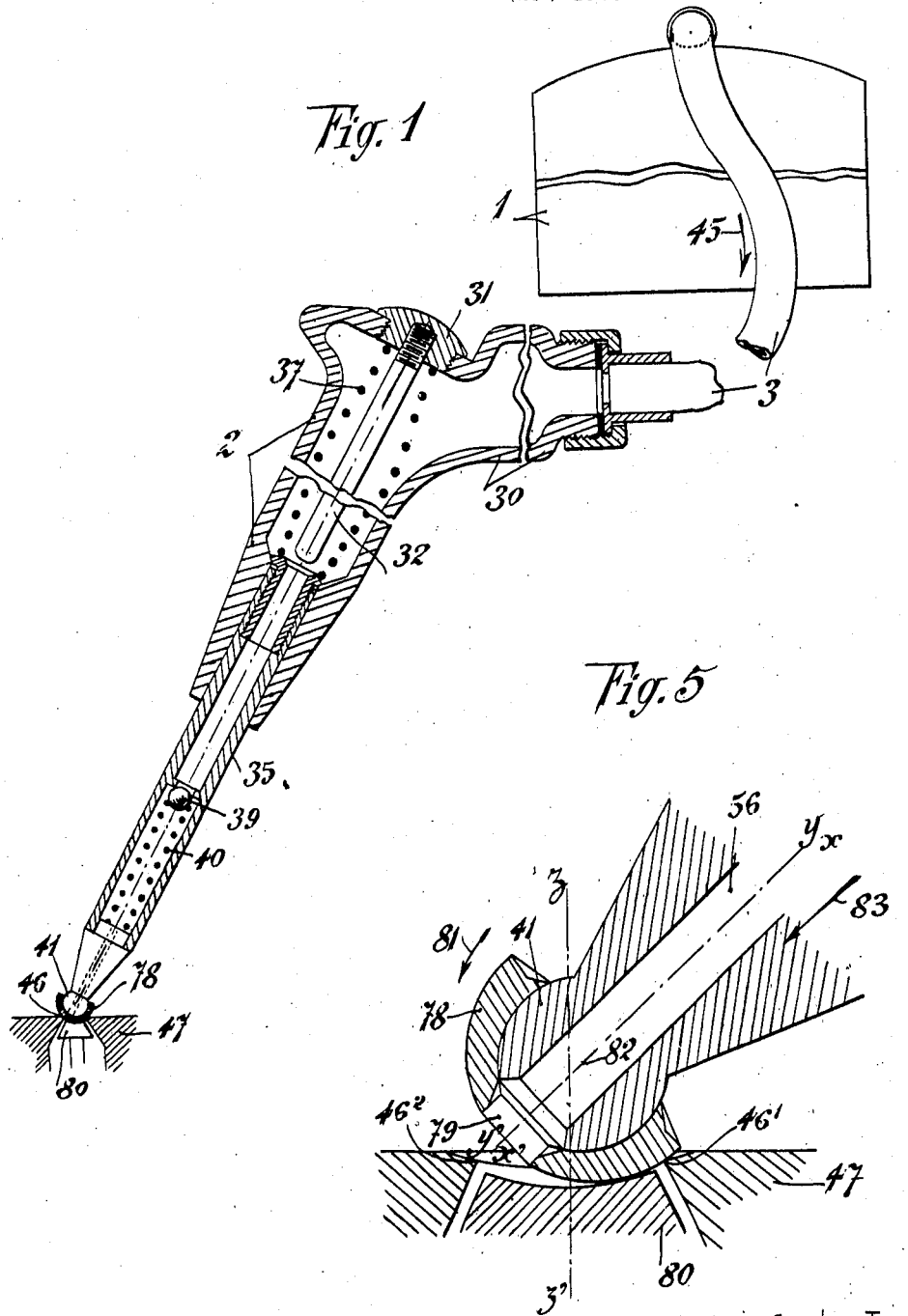

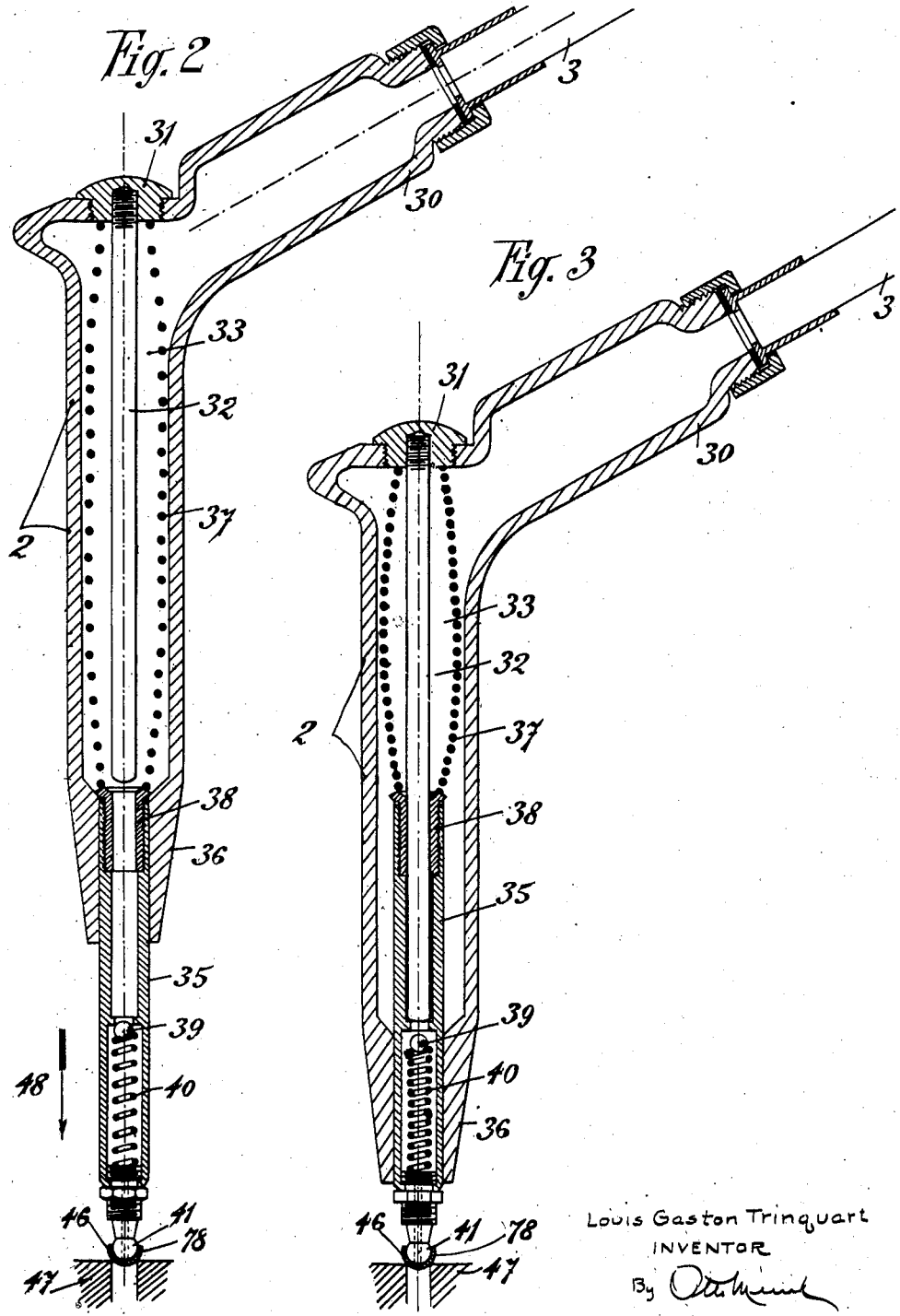

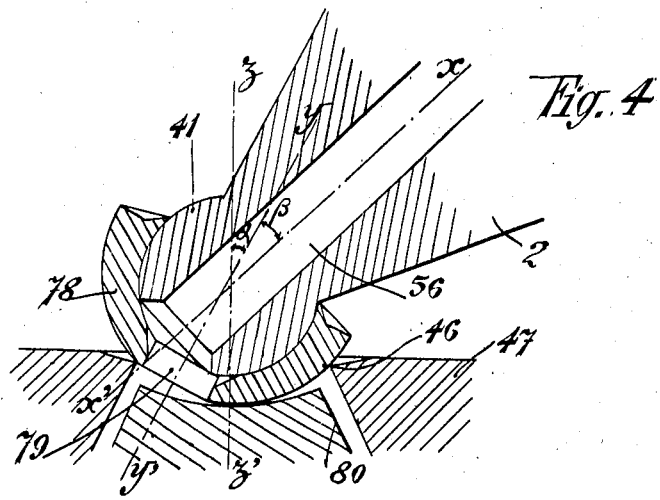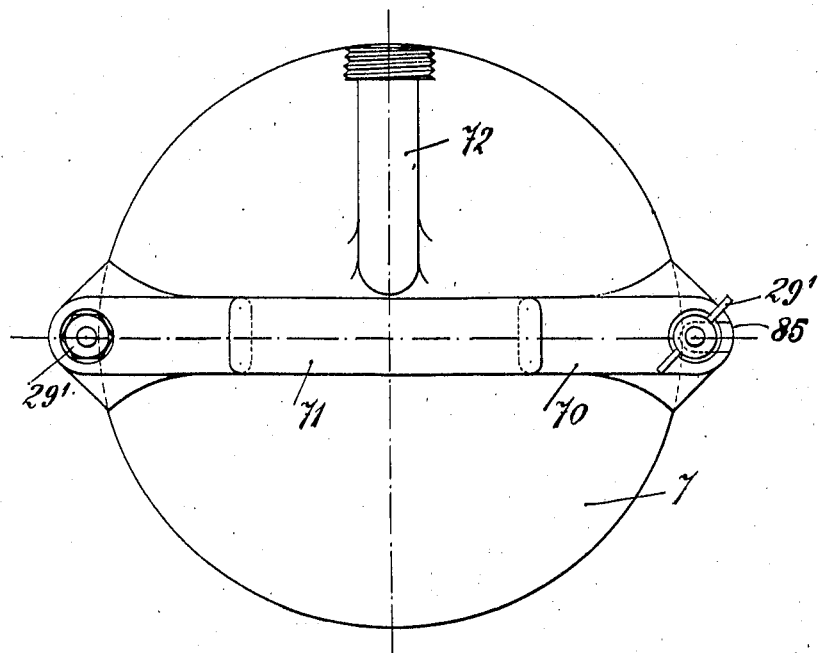

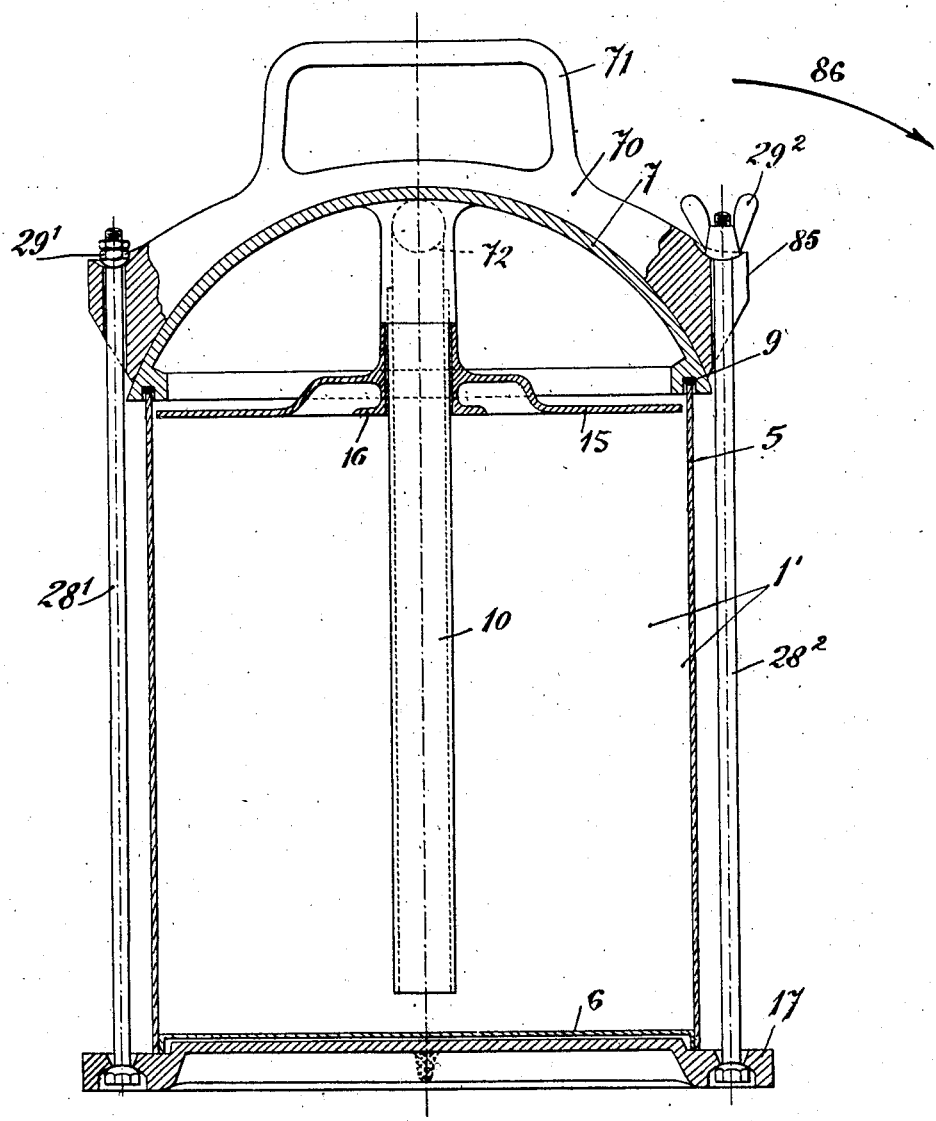

1,593,888

UNITED STATES PATENT OFFICE.

LOUIS GASTON TRINQUART, OF PARIS, FRANCE.

LUBRICATING APPLIANCE.

Application filed November 25, 1924, Serial No. 752,147, and in France August 28, 1924.

The lubricating appliances used at present in motor car garages, for example, comprise a flexible tube containing the lubricant under high pressure. This tube conveys the lubricant directly to the various parts to be lubricated. In this device, the flexible tube being subjected to a high pressure, is not easily made impermeable and there is a continual risk of its bursting and falling away from its connections, which involves unfitness for use and considerable loss of lubricant.

Moreover, in these known devices the operator is compelled first of all to fit the tube to the part of the motor car to be lubricated, then go back to the oil tank to work the pump and put the lubricant under pressure. He is compelled to do all this every time it is necessary to pass from one place to another for lubricating.

Finally, during working of the pump the mechanic cannot ascertain whether the lubricant is suitably distributed for lubrication.

Briefly the known apparatus of large capacity necessitate lengthy operations and do not allow the chauffeur to give continuous attention to his work.

The present invention relates to a new lubricating device by means of which the preceding inconveniences can be avoided. This new device is characterized by the combination of a tank containing the lubricant and a little pump which can be worked by hand, the said tank being connected with the hand pump by means of a flexible tube. Consequently the lubricant flows freely under low pressure from the tank to the pump through the flexible tube, the said lubricant only being put under high pressure by the pump itself in close vicinity to the part to be lubricated. The lubricant therefore only runs through the flexible tube under very low pressure.

Moreover, the chauffeur is near the lubricating mechanism all the time the apparatus is working, so that he can continually watch the work of lubrication without uselessly passing from one place to another, when there is some other part to be lubricated.

The invention also comprises other characteristics described later and their various combinations.

The preferred form of the invention is shown in the accompanying drawings, in which:—

Fig. 1 is an elevation partly in section showing the complete apparatus.

Figs. 2 and 3 are two longitudinal sections of the little hand pump in two successive positions of working.

Figs. 4 and 5 are two sections of the tip of the pump showing the parts of the tip in two different positions.

Fig. 6 is a vertical section of the lubricant tank from which the pump is fed.

Fig. 7 is a plan view of the tank.

The complete apparatus comprises two principal elements, the lubricant tank 1 and the hand pump 2, these two parts being connected with each other by a flexible tube 3 (Fig. 1).

The lubricant tank (Figs. 6 and 7) comprises a cylindrical body 5 with inserted bottom 6 and a lid 7 in the form of a hemispherical cap. This lid is provided with a groove in its lower edge in which is placed a packing ring making a tight joint with the upper edge of the cylindrical body 5. A flange 70 of similar form is fitted on this cap and provided with a handle 71 and a lateral notch 85.

Bolts $28^1$, $28^2$, with nuts $29^1$, $29^2$, are interposed between the flange 70, and the base 17 on which the oil tank 56 rests.

In the tank 1 is a central tube 10 which extends nearly to the bottom of the said tank 1, and is connected at its top with a nozzle 72 forming part of the lid 7 and intended for the outlet of the lubricant.

A piston 15 slides on the central tube 10 and flanges 16 are provided facilitating the grip of this piston in the mass of lubricant in the tank.

The little pump is shown in detail in Figs. 2 and 3, it has the general form of a pistol, the hollow handle 30 of which receives the end of the flexible tube 3.

The upper part 33 of the pump forms a passage for the lubricant and is closed by a screwed plug 31 into which the fixed piston 32 of the pump is screwed.

The cylinder 35 of the pump can slide freely in an extension 36 of the hollow-pump body 33 and is constantly pushed outwards by a spiral spring 37 interposed between the inner edge of this pump cylinder 35 and the screwed plug 31.

There is an inserted socket or ring 38 made of bronze for example, at the inner part of the pump cylinder, this socket being carefully bored and reamed to the diameter of the piston 32 and screwed into the said cylinder.

A ball 39 acting as a non-return valve controls the outlet from the pump cylinder 35 and is constantly forced towards its seat by a spiral spring 40.

A spherical tip 41 with a through hole is screwed into the outer end of the pump cylinder 35, and an inverted part spherical cap 78 with exit orifice 79 for the lubricant is fitted on to the spherical tip 41, as is shown in detail in Figs. 4 and 6.

The working of the apparatus is as follows:—

The lubricant tank 5 is first put on its stand 17 the flange 70 is turned on the pin $28^1$ so as to be placed over the lid 7. Then the bolt $28^2$ in the notch 85 of this flange 70 and the two nuts $29^1$, $29^2$ are screwed down tight on the ends of the bolts $28^1$ $28^2$. Thus the lid 7 is tightly held against the plastic packing ring 9 on the edge of the cylindrical tank body 5, and in this way the oil tank is rapidly and tightly shut.

Under the action of any available power such as compressed air, the piston 15 is operated to gradually drive the lubricant through the central tube 10, the nozzle 72 and flexible tube 3. The working of the piston 15 is facilitated by the fact that the said piston grips the mass of lubricant by its flanges 16.

Thus the lubricant is conveyed through the flexible tube 3, as shown by the arrow 45 to the hand pump 2. This said pump is operated to distribute the lubricant to the parts to be lubricated as follows:—The chauffeur grasps the hollow handle 30 of the pump and applies the spherical tip 41, 78 to the circular orifice 46 of the part 47 to be lubricated.

He then pushes in the direction 46 on the pump body which is resting on the part 47 to be lubricated; the pump cylinder 35 slides into the space 33 of the upper hollow body of the pump, compressing the spiral spring 37. The piston 32 enters the pump cylinder 35 with but slight friction through the inserted bronze socket 38 and drives the lubricant contained by the pump cylinder 35 through the non-return valve 39.

The pumped lubricant runs through the hole channel of the spherical tip 41 and enters the recipient part 47 (Fig. 3).

When the forcing motion of the pump is finished, the chauffeur ceases to exert pressure in the direction 48; the spiral spring 37, compressed in the downward pumping motion and being supported on the inserted plug 31 repels the pump cylinder 35 in the direction 48. This pump cylinder then returns to the position indicated in Fig. 2 and immediately fills with a new supply of lubricant. At the same time the nonreturn ball valve 39 is pressed against its seat by the spiral spring 40 and prevents all ingress of air. Thus the hand pump is again ready to pump lubricant.

Briefly, the chauffeur who holds the hollow handle 30 of the pump has merely to exert pressure in the direction 48 on the part for lubrication.

The improved device previously described gives numerous advantages:—

In the first place the lubricant is kept in the flexible tube 3 at a slight pressure, produced by the piston 15; this lubricant is only brought to the requisite high pressure for use in the pump body 35 in close vicinity to the part 47 to be lubricated. Consequently the flexible tube 3 only works under low pressures and rupture of the tube joints or the tube itself is avoided.

Moreover, handling of the apparatus is very simple. The chauffeur has merely to grasp the handle 30 of this little pistol like pump and exert a pressure on the part 47 to be lubricated.

He can, almost without changing his place pass from one point to another of the mechanism being lubricated. Finally he can continually follow the work of lubrication with the eye and regulate it so as to assure a suitable quantity of lubricant being distributed.

It will be seen that the system of closing the lubricant tank 1 is simple and effective, because the lid 7 can be hermetically closed on the body 5 and the tank fixed on its stand 17.

Moreover, the said tank can be immediately taken from its stand 17 when empty, for which purpose it suffices to loosen the winged nut $29^2$ and turn the bolt $28^2$ in the direction 86 so as to free the same from the notch 85 of the flange 70. This flange 70 is then turned on the bolt 28' and the lid 7, central tube 10 and the piston 15, are removed.

Another tank 5 filled with lubricant is then placed on the stand 17, the lid 7, central tube 10 and piston 15, being placed in position.

Finally it suffices to replace the flange 70 on the hemispherical lid 7, fix the bolt $28^2$ in the notch 85 and screw the nut $29^2$ down tight, when the apparatus is again ready for work.

The little hand pump is easily managed and sure in working, in particular the bronze socket 38 being of short length can without great cost be reamed with great precision to a diameter very similar to that of the piston 32 so that even without packing, the piston rod will be a tight fit during its movement in the socket.

The inner diameter of the pump cylinder 35 may be a little greater than that of the socket 38 so that the piston 32 will not rub against the inner surface of the cylinder. Thus the friction produced in working the pump is reduced and any liability of the piston 32 to grip the pump cylinder 35 avoided.

The terminal device represented in detail in Figs. 4 and 5 comprising a double jointing viz the joint of the part spherical cap 78 on the spherical extremity 41 of the tip for which it forms a spherical seat and the joint of this part spherical cap itself on the recipient part 47.

This device works as follows:—

The tip of the pistol like pump is pushed onto the recipient part 47 in the direction of the arrow 83, as indicated in Fig, 5, the axis $y\ y'$ of the part spherical cap being coincident with axis $x\ x'$ of the tip properly so called.

The combined reactions and frictional forces undergone by the part spherical cap 78 have for effect to make the said part spherical cap 78 turn at a certain angle on the tip 41 in the direction of the arrow 81 so that this cap passes from the position given in Fig. 5 to that of Fig. 4. The axis $y\ y'$ of the cap 78 acquires an incline $\beta$ with respect to the axis $x\ x$ of the lubricating apparatus, this axis $y\ y'$ itself presenting an incline $\alpha$ in relation to the axis $z\ z'$ of the recipient part 47, consequently the lubricating device can take a total incline of $\alpha+\beta$ in relation to the recipient part 47 passage of the lubricant however remaining assured by the interior conduit 56 and the orifice 79, as shown in Fig. 4.

Having now particularly described and ascertained the nature of my said invention and in what manner the same is to be performed, I declare that what I claim is:—

1. In a lubricating device a tank containing lubricant a part spherical lid covering the said tank; a spherical flange fitting on to the said lid, means for tightening the flange on the lid, means for permitting the flow of lubricant from the tank, means for putting the said lubricant under pressure.

2. In a lubricating apparatus a tank containing the lubricant, a part spherical covering the said tank; a part spherical flange fitting onto the said lid, a stand upon which the tank rests; means for connecting the flange with the stand and tightening the said flange on to lid, means for permitting the flow of lubricant from the tank, means to put the lubricant under pressure.

3. In a lubricating apparatus a tank containing the lubricant; a part spherical lid covering the said tank a part spherical flange fitting upon the said lid, a stand on which the said tank rests, a first bolt uniting the stand and part spherical flange; a second bolt jointed on the stand and fitted into a notch in the part spherical flange nuts on these bolts for tightening the flange on the lid, means for permitting the flow of the lubricant from the reservoir, means for putting the lubricant under pressure.

4. In a lubricating apparatus, a tank containing lubricant, a lid closing the said tank, a central tube carried by the tank and extending nearly to the bottom of the tank and having its upper end outside the tank, a piston sliding on the said central tube and forcing the lubricant therethrough, offset flanges on the said piston to form pockets in the latter to receive the lubricant and assure proper gripping action thereon by the piston.

5. In a lubricating apparatus, the combination of a tank containing lubricant under relatively slight pressure, a small hand pump, means for conveying the lubricant under slight pressure from the tank to the pump wherein the lubricant is subjected to increased pressure, a tip at the end of the pump body and adapted to receive the lubricant placed under pressure in the pump, a spherical seat on said tip, and a spherical member embracing said seat and provided with a lubricant duct.

6. In a lubricating apparatus, the combination of a tank containing lubricant under relatively slight pressure, a small hand pump, means for conveying the lubricant under slight pressure from the tank to the pump wherein the lubricant is placed under increased pressure, a spherical tip at the end of the pump body and adapted to receive the lubricant placed under pressure in the pump, and a spherical cap engaging said spherical tip and adapted to connect with a receiving member.

In testimony whereof I affix my signature.

LOUIS GASTON TRINQUART.